(12) United States Patent
Reichle

(10) Patent No.: US 6,514,094 B1
(45) Date of Patent: Feb. 4, 2003

(54) SET OF CONTACT BLADES IN A MULTIPLE CONNECTOR STRIP FOR CABLE CONNECTORS, AND MULTIPLE CONNECTOR STRIP

(75) Inventor: Hans Reichle, Wetzikon (CH)

(73) Assignee: Reichle & De-Massari AG, Wetzikon (CH)

(*) Notice: Subject to any disclaimer, the term of this patent is extended or adjusted under 35 U.S.C. 154(b) by 0 days.

(21) Appl. No.: 09/508,754
(22) PCT Filed: Jul. 13, 1999
(86) PCT No.: PCT/CH99/00318
§ 371 (c)(1),
(2), (4) Date: Mar. 16, 2000
(87) PCT Pub. No.: WO00/04607
PCT Pub. Date: Jan. 27, 2000

(30) Foreign Application Priority Data

Jul. 16, 1998 (CH) .............................................. 1511/98
Jul. 16, 1998 (CH) .............................................. 1512/98

(51) Int. Cl.⁷ .............................................. H01R 29/00
(52) U.S. Cl. ........................ 439/188; 439/922; 439/516
(58) Field of Search ................................ 439/188, 709, 439/922, 516; 200/51.1

(56) References Cited

U.S. PATENT DOCUMENTS 348,875 A * 9/1886 Wightman et al. ......... 200/51.1
3,611,264 A 10/1971 Ellis, Jr.
4,789,354 A * 12/1988 Smith et al. ................ 439/922
5,624,267 A 4/1997 Johnston

FOREIGN PATENT DOCUMENTS

| DE | 196 29643 | 1/1998 |
| EP | 0 370 380 | 5/1990 |
| EP | 0 643 440 | 3/1995 |
| EP | 0 645 938 | 3/1995 |
| EP | 0 765 011 | 3/1997 |
| EP | 0 793 303 | 9/1997 |
| WO | 92/08255 | 5/1992 |

* cited by examiner

Primary Examiner—Javaid Nasri
(74) Attorney, Agent, or Firm—Robert Kinberg; Venable

(57) ABSTRACT

A cable terminal contract assembly (3) encompasses two spaced apart tongues (4) with contact springs (7) exhibiting contact points (8), wherein the longitudinal edges of the tongues are intended for the insertable, positive meshing with guide grooves of one of the chambers of a multiple-connection strap. The tongues (4) exhibit wire connecting means at the free end, insulation-piercing connecting devices (5), and are connected on the inner end by a web (6) with a narrow width. The contact assembly is a through contact that is transformable into a separating contact by separating the web, or into a switching contact by inserting an isolating piece or via molding. The connection strap casing can be produced as a one-piece plastic body.

4 Claims, 2 Drawing Sheets

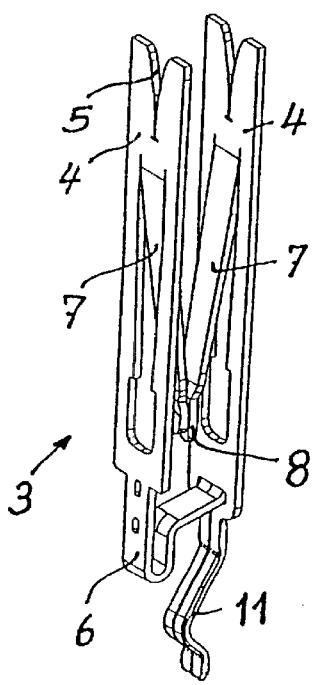
Fig. 3
Fig. 4
Fig. 6
Fig. 5
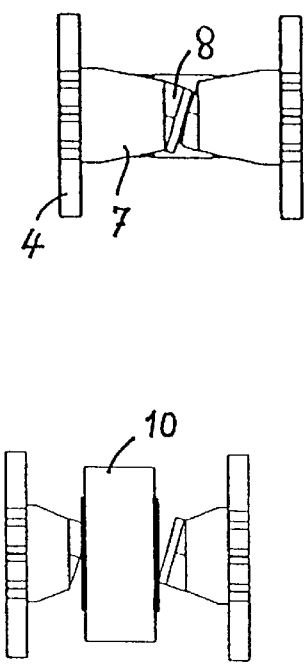
Fig. 7
Fig. 8

SET OF CONTACT BLADES IN A MULTIPLE CONNECTOR STRIP FOR CABLE CONNECTORS, AND MULTIPLE CONNECTOR STRIP

This invention relates to a contact assembly for insertion into lengthwise spaced open chambers of a multiple connection strap for cable terminals, in particular a distributor of telephone and data lines.

Previous contact assemblies were designed for placement into open casing parts of the strap during the manufacture of finished connection straps, after which the casing was completed with additional parts.

Their unsuitable configurations make the known contact assemblies unusable for insertion into lengthwise spaced open chambers of a multiple connection strap, which hence requires assembly on one side from outside.

Therefore, the object of this invention is to provide a contact assembly that enables assembly on one side from outside.

This is achieved according to the invention first by virtue of the fact that the contact assembly encompasses at least two spaced tongues with contact springs, wherein the longitudinal edges of the tongues are intended for insertion and positive meshing in guide grooves of one of the chambers of a multiple connection strap; that the tongues exhibit wire connecting means at the free end, preferably insulation-piercing connecting devices, and are connected at the inner end by a web; and that at least the wire connecting means, contact springs and web sequentially arranged, in at least an approximately flush manner, between the longitudinal edges of the tongues.

The web is here preferably of limited width and separable.

This makes it possible for the contact assembly to be a through contact transformable into an isolating contact by separating the web, or into a switching contact by inserting an isolating piece or via molding.

To protect the highly sensitive contact points in these contact assemblies against contamination and/or damage during manipulations, like testing, separating, etc., the invention provides for arranging the contact points laterally inclined, so that only the edges of the contact points are touched when inserting a plug connector.

A contact assembly according to this invention now makes it possible to assemble a connection strap from one side on the outside. In turn, this results in the task of developing a corresponding connection strap that can then only be assembled with a single embodiment of a contact assembly according to the invention, but can still be used as the through strap, or separation strap or switching strap.

Such a multiple connection strap with lengthwise spaced open chambers for the insertion of one contact assembly each, for cable terminals, in particular a distributor of telephone and data lines, is initially characterized according to the invention by the fact that its casing now consists of a one-piece plastic body.

Preferably, the chambers exhibit lateral guide grooves for the form-fitting accommodation of the longitudinal edges of at least two spaced tongues on the contact assembly, wherein the tongues carry contact springs, and exhibit wire connecting means, preferably insulation-piercing connecting devices, at the free end, and are connected on the inside end by a web, and wherein at least the wire connecting means, the contact springs and the web are located one in back of the other in the assembly direction, in at least an approximately flush manner, between the longitudinal edges of the tongues.

The universality of the connection strap according to the invention is increased by virtue of the fact that the chambers exhibit a hole for temporarily holding a separating tool in the area of the preferably separable web that connects the tongs of a contact assembly on the inner end.

In addition, it is advantageous for the chambers in the area of the contact areas of a contact assembly to exhibit guiding means for incorporating an isolating and separating piece.

In this case, the connection strap can be a through strap or separating strap or a switching strap, by virtue of the fact that the contact assemblies are through contacts that can be transformed into separating contacts by separating the web, or into switching contacts by inserting an isolating and separating piece or via molding.

These measures now make it possible to assemble the one-piece distributor straps on the front side with uniform contact assemblies, whose distributor straps then can, depending on designation, be left as connecting straps, or transformed into separating straps by separating the webs, or into switching straps by inserting an isolating piece or via molding.

This results in an extremely cost-effective production and storage.

Embodiments of the subject matter of the invention will be described in greater detail below based on the drawing. Shown on:

FIG. 3 is a graphic depiction of a contact assembly according to the invention;

FIGS. 4 to 6 is a side view of the contact assembly according to FIG. 3 as a through contact, separating contact or switching contact; and FIGS. 7 and 8 is top view on an enlarged scale of the contact point of the contact assembly according to FIG. 3 in varying functions.

Figure 1:
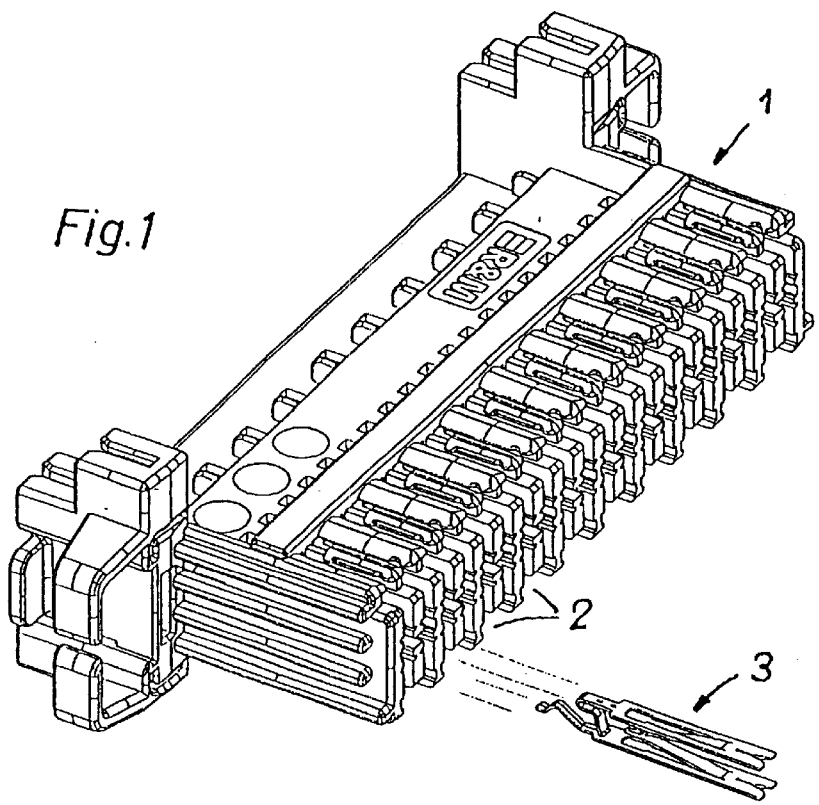
FIG. 1 is a graphic depiction of a one-piece multiple-connection strap with upstream contact assembly in the assembly direction.
Figure 2:
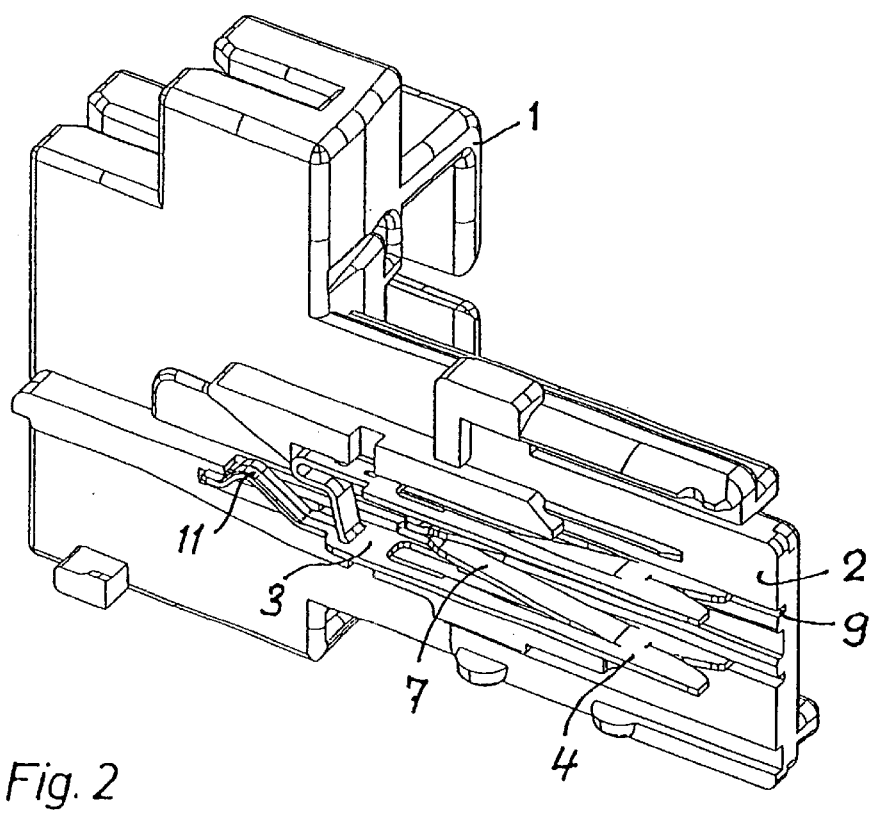
FIG. 2 is a sectional graphic depiction of the multiple-connection strap according to FIG. 1 on an enlarged scale, with contact assembly inserted.

The multiple-connection strap according to the invention in FIGS. 1 and 2 is intended for cable terminals, in particular a distributor of telephone and data lines, with a casing 1 made out of plastic, which accommodates numerous contact assemblies 3 spaced apart lengthwise.

According to the invention, the plastic casing 1 is designed as a single piece, and encompasses numerous longitudinally spaced apart open chambers 2 for the insertion of one contact assembly 3 each.

The chambers 2 here exhibit lateral, here parallel guide grooves 9 (FIG. 2) for the insertable, form-fitting accommodation of at least two spaced apart, here parallel tongues 4 at the contact assembly 3.

In addition, the chambers 2 exhibit a hole in the area of a separable web 6 that connects the tongues 4 of a contact assembly 3 at the inner end for the temporary accommodation of a separating tool (not shown).

In addition, the chambers 2 exhibit guide means (not shown) in the area of contact points 8 of a contact assembly 3 for accommodating an isolating and separating piece (FIG. 6).

To be able to use a contact assembly in such a chamber 2 in an aligned and torsion-resistant manner, each contact assembly 3 in FIG. 3 according to the invention encompasses at least two spaced apart, here parallel tongues 4, with contact springs 7 exhibiting contact points 8, wherein the longitudinal edges of the tongues are intended for the insertable, positive meshing in guide grooves 9 of one of the chambers 2 of the multiple-connection strap 1 (FIG. 2).

The tongues 4 of the contact assembly 3 additionally exhibit wire connecting means at the free end, in particular insulation-piercing connecting devices 5, and are connected at the inner end by at least one, preferably separable web 6.

In this case, at least the wire connecting means 5, the contact springs 7 and the web 6 are sequentially arranged, in an approximately flush manner, between the longitudinal edges of the tongues 4 intended for positive meshing.

According to FIGS. 4, 5 and 6, the contact assembly is a through contact that can be transformed into a separating contact by separating the web, or into a switching contact by inserting an isolating piece or via contact molding.

These measures now make it possible to assemble the one-part or one-piece distribution straps on the front side with uniform contact assemblies, wherein these distribution straps can then be transformed into connecting or through strap, separating strap or switching strap, depending on designation, by having the contact assemblies be through contacts that can be transformed into separating contacts by separating the web, or into switching contacts by inserting an isolating separation piece or via molding.

To protect the highly sensitive contact points 8 against contamination and/or damage for these contact assemblies during manipulations, e.g., tests, separation, etc., FIGS. 7 and 8 also envisage arranging the contact points 8 laterally inclined, so that only the edges of the contact points are touched when inserting a plug connector 10 (FIG. 8), but the actual contact surface remains undisturbed. Each contact assembly 3 can also exhibit a parallel tap 11.

When using a contact assembly for solder-free insulation displacement wiring that encompasses an insulation displacement slit and a cutting edge arranged behind the insulation displacement slit spaced apart at a preset distance, additional lateral guide grooves must be provided in each chamber in order to accommodate the longitudinal edges of the insulation displacement receptacle or tongues with the cutting edge.

What is claimed is:

1. A modular multiple connection strap for cable connections, comprising a one-piece plastic housing (1) having a longitudinal side, a plurality of modular spaced and open chambers (2) on the longitudinal side for inserting respectively, one contact assembly (3), characterized in that the connection strap is a through strap, or a separating strap or a switching strap, in that the contact assemblies (3), each having a having a pair of tongues (4), a pair of contact springs (7) and a separating web (6), are through contacts that can be converted to separation or switching contacts by deforming the separating a web (6) that connects the inside ends of tongues (4) of the contact assembly (3) and in the case of a switching contact also including an insulating separator, which displaces one of the contact springs (7), attached to one of the pair of tongues (4), such that one of said contact springs is flush with said one of the pair of tongues (4).

2. The modular multiple connection strap according to claim 1, characterized in that the chambers (2) in an area of said web (6) that connects the tongues (4) of a contact assembly (3) on the inside end are provided with an opening for temporarily accommodating a separating tool.

3. The modular multiple connection strap according to claim 1 characterized in that the chambers (2) are provided in the area of a contact locations (8) of the contact assembly (3) with guide means for inserting said insulation separator.

4. The modular multiple connection strap according to claim 1, characterized in that a contact locations (8) are laterally inclined such that when an plug connector is inserted, it only touches the edges of the contact locations.

* * * * *